United States Patent
Hong et al.

(10) Patent No.: US 11,739,186 B2
(45) Date of Patent: Aug. 29, 2023

(54) PREPARATION METHOD OF HIGHLY TRANSPARENT SELF-ADHESIVE PBAT CLING FILM

(71) Applicants: Ruojing Hong, Anhui (CN); Lukun Han, Anhui (CN); Chengwen Tang, Anhui (CN); Fan Lu, Anhui (CN)

(72) Inventors: Ruojing Hong, Anhui (CN); Lukun Han, Anhui (CN); Chengwen Tang, Anhui (CN); Fan Lu, Anhui (CN)

(73) Assignee: Anhui Jumei Biotechnology Co., Ltd., Anhui (CN)

( * ) Notice: Subject to any disclaimer, the term of this patent is extended or adjusted under 35 U.S.C. 154(b) by 480 days.

(21) Appl. No.: 16/897,294

(22) Filed: Jun. 10, 2020

(65) Prior Publication Data
US 2021/0317275 A1 Oct. 14, 2021

(30) Foreign Application Priority Data

Apr. 8, 2020 (CN) .......................... 202010267429.2

(51) Int. Cl.
| | |
|---|---|
| *C08J 5/18* | (2006.01) |
| *B29C 48/40* | (2019.01) |
| *B29D 7/01* | (2006.01) |
| *C08J 3/12* | (2006.01) |
| *C08K 5/053* | (2006.01) |
| *C08K 5/10* | (2006.01) |
| *C08L 33/08* | (2006.01) |
| *C08L 67/02* | (2006.01) |
| *B29K 67/00* | (2006.01) |

(52) U.S. Cl.
CPC ................ *C08J 5/18* (2013.01); *B29C 48/40* (2019.02); *B29D 7/01* (2013.01); *C08J 3/12* (2013.01); *C08K 5/053* (2013.01); *C08K 5/10* (2013.01); *C08L 33/08* (2013.01); *C08L 67/02* (2013.01); *B29C 2948/92209* (2019.02); *B29K 2067/00* (2013.01); *C08J 2333/08* (2013.01); *C08J 2367/02* (2013.01); *C08L 2201/06* (2013.01); *C08L 2201/10* (2013.01); *C08L 2201/14* (2013.01); *C08L 2203/16* (2013.01); *C08L 2207/04* (2013.01)

(58) Field of Classification Search
CPC ... C08J 5/18; C08J 3/12; C08J 2367/02; C08J 2333/08; B29K 2067/00; C08L 33/08; C08L 2201/06; C08L 2201/10; C08L 2201/14; C08L 2203/16; C08L 2207/04; C08L 67/02; C08K 5/053; C08K 5/10; B29C 48/40; B29C 2948/92209; B29D 7/01
USPC ........................................................ 428/480
See application file for complete search history.

(56) References Cited

U.S. PATENT DOCUMENTS

2012/0077905 A1* 3/2012 Chen .................... C08L 101/16
523/447

* cited by examiner

Primary Examiner — Hui H Chin

(57) ABSTRACT

The invention discloses a preparation method of highly transparent self-adhesive PBAT cling film. The raw materials include PBAT, ACR, glycerin, and glycerin fatty acid ester; the preparation methods include mixing, preparing pellets, film blowing, and film winding. In the invention, ACR is added into PBAT resin, which increases the ductility, shrinkage property and flatness of winding of PBAT cling films; glycerin can improve the extrusion stability, softness and adhesion properties of PBAT cling films; glycerin fatty acid ester can improve the anti-fog property of PBAT cling films; meanwhile, glycerin and glycerin fatty acid can play a synergistic role to further enhance the anti-fog property of PBAT cling films. The PBAT cling film prepared by the invention has superior physical property, high transparency, high adhesion property, high shrinkage property, smooth flatness of winding free of wrinkles and good air permeability.

7 Claims, No Drawings

PREPARATION METHOD OF HIGHLY TRANSPARENT SELF-ADHESIVE PBAT CLING FILM

BACKGROUND OF THE INVENTION

1. Field of the Invention

The invention relates to the technical field of polymers, in particular to a preparation method of highly transparent self-adhesive PBAT cling film.

2. Description of the Related Art

At present, most of the cling films on the market are PE and PVC plastic cling films that are not biodegradable; the PVC cling film contains the plasticizer dioctyl adipate (DEHA). WWF lists it as a substance that may damage the human endocrine system. Some European countries, Japan, and South Korea have banned the use of PVC cling films, and China has also banned the use of PVC cling films. The PE cling film has poor flexibility, shrinkage property, and adhesion property, and PE and PVC cling films will cause white pollution after being discarded, which will seriously damage the ecological environment.

PBAT is a thermoplastic biodegradable plastic, a copolymer of butanediol adipate and butylene terephthalate. PBAT has good ductility, elongation at break, heat resistance, and impact properties, but poor air permeability, poor adhesion property, and difficulty in flatting during winding. These shortcomings limit its application in vegetables, fruits, and food cling films.

SUMMARY OF THE INVENTION

The invention aims to provide a preparation method of highly transparent self-adhesive PBAT cling film, which solves the above issues and improves the problem of white pollution caused by cling films.

In order to achieve the objectives above, the invention provides the following technical solutions: a preparation method of highly transparent self-adhesive PBAT cling film, comprising the following steps:

S1, adding PBAT, ACR, glycerin, glycerin fatty acid ester to a mixer in proportion to mix, to obtain a uniformly mixed material;

S2, extruding, stretching, cooling, and pelletizing the obtained uniformly mixed material in an extruder to obtain pellets for producing cling film;

S3, adding the obtained pellets to the film blowing machine for extrusion, inflation, traction, cooling, and winding to obtain a highly transparent self-adhesive PBAT cling film;

S4, rewinding the cling film obtained in S3 to prepare a small roll of highly transparent self-adhesive PBAT cling film;

the amount of each component in S1 by weight is: 88-94.5% of PBAT, 3-8% of ACR, 0.5-1% of glycerin, and 1-3% of glycerin fatty acid ester; the PBAT is a copolymer of butanediol adipate and butylene terephthalate, the ACR is a polymer copolymer of acrylate, and the molecular weight of the ACR is 500-10000.

As an improvement, the extruder in S2 adopts a twin-screw extruder.

As an improvement, the length-diameter ratio of the screw in the twin-screw extruder is 52:1.

As an improvement, the barrel temperature of the twin-screw extruder in S2 is 140-155° C., and the die temperature thereof is 155-170° C.

As an improvement, the barrel temperature of the film blowing machine is 150-165° C., the die temperature thereof is 165-180° C., and the blowup ratio is 3.

As an improvement, the mixer is a high-speed mixer, and the rotational speed of the high-speed mixer is 200 r/min.

As an improvement, the rewinding step in S4 is performed on a cling film rewinding machine, and the speed of the cling film rewinding machine is 100-150 m/min.

The advantageous effects of the invention are:

The invention adopts ACR with special molecular weight to modify PBAT, which increases the ductility, shrinkage property and flatness of winding of PBAT, so that the PBAT film obtained by winding is flat and free of wrinkles; glycerin can improve the extrusion stability, softness and adhesion properties of PBAT cling films, which makes the thickness of the extruded PBAT film even, and it is easier to make a flat cling film; glycerin fatty acid ester can improve the anti-fog property of PBAT cling films and improve the transparency of cling films. The preparation method disclosed in the invention can simplify the production process of PBAT cling films, accelerate the formation of PBAT cling films, improve production efficiency, and reduce production costs; the produced PBAT cling films can replace PE and PVC cling films on the market to reduce environmental pollution.

DETAILED DESCRIPTION OF THE PREFERRED EMBODIMENTS

The invention will be further described by the way of embodiments hereinafter, but it does not limit the invention to the scope of the described embodiments.

Embodiment 1

The embodiment discloses a preparation method of highly transparent self-adhesive PBAT cling film, comprising the following steps:

S1, adding 95.5 parts of PBAT and 3 parts of ACR to the high-speed mixer in terms of parts by weight, and mixing at a rotational speed of 200 r/min; then slowly adding 0.5 parts of glycerin and mixing at a rotational speed of 200 r/min for 2 minutes; then adding 2 parts of glycerin fatty acid ester and mixing at a rotational speed of 200 r/min for 3 minutes, to obtain a uniformly mixed material.

S2, Extruding, stretching, cooling, and pelletizing the obtained uniformly mixed material in a twin-screw extruder with a length-diameter ratio of 52:1, to obtain pellets for producing cling film; the barrel temperature of the twin-screw extruder is 150° C., and the die temperature thereof is 160° C.

S3, Adding the obtained pellets to the film blowing machine for extrusion, inflation, traction, cooling, and winding, to obtain a highly transparent self-adhesive PBAT cling film; the barrel temperature of the film blowing machine is 160° C., the die temperature thereof is 170° C., and the blowup ratio is 3.

S4, Rewinding the highly transparent self-adhesive PBAT cling film in a cling film rewinding machine at a speed of 120 m/min, to prepare a small roll of cling film.

The cling films prepared in S3 and S4 are smooth, free of wrinkles, of high transparency and good anti-fog property.

Embodiment 2

The embodiment discloses a preparation method of highly transparent self-adhesive PBAT cling film, comprising the following steps:

S1, adding 92.2 parts of PBAT and 5 parts of ACR to the high-speed mixer in terms of parts by weight, and mixing at a rotational speed of 200 r/min; then slowly adding 0.8 parts of glycerin and mixing at a rotational speed of 200 r/min for 2 minutes; then adding 2 parts of glycerin fatty acid ester and mixing at a rotational speed of 200 r/min for 3 minutes, to obtain a uniformly mixed material.

S2, Extruding, stretching, cooling, and pelletizing the obtained uniformly mixed material in a twin-screw extruder with a length-diameter ratio of 52:1, to obtain pellets for producing cling film; the barrel temperature of the twin-screw extruder is 140° C., and the die temperature thereof is 155° C.

S3, Adding the obtained pellets to the film blowing machine for extrusion, inflation, traction, cooling, and winding, to obtain a highly transparent self-adhesive PBAT cling film; the barrel temperature of the film blowing machine is 150° C., the die temperature thereof is 165° C., and the blowup ratio is 3.

S4, Rewinding the highly transparent self-adhesive PBAT cling film in a cling film rewinding machine at a speed of 150 m/min, to prepare a small roll of cling film.

Embodiment 3

The embodiment discloses a preparation method of highly transparent self-adhesive PBAT cling film, comprising the following steps:

S1, adding 88 parts of PBAT and 8 parts of ACR to the high-speed mixer in terms of parts by weight, and mixing at a rotational speed of 200 r/min; then slowly adding 1 part of glycerin and mixing at a rotational speed of 200 r/min for 2 minutes; then adding 3 parts of glycerin fatty acid ester and mixing at a rotational speed of 200 r/min for 3 minutes, to obtain a uniformly mixed material.

S2, Extruding, stretching, cooling, and pelletizing the obtained uniformly mixed material in a twin-screw extruder with a length-diameter ratio of 52:1, to obtain pellets for producing cling film; the barrel temperature of the twin-screw extruder is 155° C., and the die temperature thereof is 170° C.

S3, Adding the obtained pellets to the film blowing machine for extrusion, inflation, traction, cooling, and winding, to obtain a highly transparent self-adhesive PBAT cling film; the barrel temperature of the film blowing machine is 165° C., the die temperature thereof is 180° C., and the blowup ratio is 3.

S4, Rewinding the highly transparent self-adhesive PBAT cling film in a cling film rewinding machine at a speed of 100 m/min, to prepare a small roll of cling film.

The embodiment discloses the performance data of the highly transparent self-adhesive PBAT cling film obtained in Embodiments 1-3.

Control Group 1:

S1, adding 95.5 parts of PBAT and 3 parts of ACR to the high-speed mixer in terms of parts by weight, and mixing at a rotational speed of 200 r/min; then slowly adding 2 parts of glycerin fatty acid ester and mixing at a rotational speed of 200 r/min for 3 minutes, to obtain a uniformly mixed material.

S2, Extruding, stretching, cooling, and pelletizing the obtained uniformly mixed material in a twin-screw extruder with a length-diameter ratio of 52:1, to obtain pellets for producing cling film; the barrel temperature of the twin-screw extruder is 150° C., and the die temperature thereof is 160° C.

S3, Adding the obtained pellets to the film blowing machine for extrusion, inflation, traction, cooling, and winding, to obtain a highly transparent self-adhesive PBAT cling film; the barrel temperature of the film blowing machine is 160° C., the die temperature thereof is 170° C., and the blowup ratio is 3.

S4, Rewinding the highly transparent self-adhesive PBAT cling film in a cling film rewinding machine at a speed of 100 m/min, to prepare a small roll of cling film.

Control Group 2:

S1, adding 95.5 parts of PBAT and 3 parts of ACR to the high-speed mixer in terms of parts by weight, and mixing at a rotational speed of 200 r/min; then slowly adding 0.5 parts of glycerin and mixing at a rotational speed of 200 r/min for 3 minutes, to obtain a uniformly mixed material.

S2, Extruding, stretching, cooling, and pelletizing the obtained uniformly mixed material in a twin-screw extruder with a length-diameter ratio of 52:1, to obtain pellets for producing cling film; the barrel temperature of the twin-screw extruder is 150° C., and the die temperature thereof is 160° C.

S3, Adding the obtained pellets to the film blowing machine for extrusion, inflation, traction, cooling, and winding, to obtain a highly transparent self-adhesive PBAT cling film; the barrel temperature of the film blowing machine is 160° C., the die temperature thereof is 170° C., and the blowup ratio is 3.

S4, Rewinding the highly transparent self-adhesive PBAT cling film in a cling film rewinding machine at a speed of 120 m/min, to prepare a small roll of cling film.

Test Method:

1. Anti-Fog Property Test

Low Temperature Anti-Fog Test: adding 200 ml of water to a 250 ml beaker, covering it with the highly transparent self-adhesive PBAT cling film, and putting it in a refrigerator at 3-5° C. for 3 hours; observing the adhesion state of water droplets on the surface of the cling film.

High Temperature Anti-Fog Test: adding 50 ml of water to a 250 ml beaker, covering it with the highly transparent self-adhesive PBAT cling film, and putting it in a 60° C. water bath at a constant temperature of 40 minutes; observing the adhesion state of water droplets on the surface of the cling film.

Criteria

Excellent Anti-Fog Property: the film surface is clear, transparent, and no water droplets are adhered;

Good Anti-Fog Property: there is transparent or translucent water mist on part of the surface of the film;

Poor Anti-Fog Property: there are large areas of small water droplets or densely packed large water droplets on the surface of the film.

2. Adhesion Property Test

Packaging the cling film on a shallow tray, and putting it in a refrigerator at 3-5° C. for 8 hours; observing whether the cling film on the bottom of the shallow tray is loose.

Excellent Adhesion Property: the cling film on the bottom of the shallow tray is not loose; Poor Adhesion Property: the cling film on the bottom of the shallow tray is loose.

3. Shrinkage Property Test

Packaging the cling film on a shallow tray, and putting it in a refrigerator at 3-5° C. for 8 hours; observing the tightness state of the cling film on the bottom of the shallow tray.

Excellent Shrinkage Property: the surface of the cling film is tight and smooth; Poor Shrinkage Property: the surface of the cling film is not tight and there are a few ripples.

4. Mechanical Property Test

Testing the tensile strength and elongation at break of the cling film with GB/T 1040.2-2006.

Testing the tear strength of the cling film with GB/T 16578.1-2008.

5. Oxygen Transmission Rate and Moisture Transmission Rate are Detected by Relevant Instruments.

The test results are shown in the following tables:

TABLE 1

Test Data of Highly Transparent Self-Adhesive PBAT Cling Film

|  | Anti-Fog Property | Adhesion Property | Shrinkage Property | Oxygen Transmission Rate $cm^3/(m^2 \cdot d \cdot atm)$ | Moisture Transmission Rate $g/(m^2 \cdot d \cdot atm)$ |
|---|---|---|---|---|---|
| Embodiment 1 | Good | Excellent | Excellent | 108000 | 54 |
| Embodiment 2 | Excellent | Excellent | Excellent | 125000 | 58 |
| Embodiment 3 | Excellent | Excellent | Excellent | 143000 | 62 |
| Control Group 1 | Good | Poor | Excellent | 103000 | 51 |
| Control Group 2 | Poor | Good | Excellent | 92000 | 49 |

TABLE 2

Testing Data of Mechanical Property of Highly Transparent Self-Adhesive PBAT Cling Film

|  | Longitudinal Tensile Strength (MPa) | Transverse Tensile Strength (MPa) | Longitudinal Elongation at Break | Transverse Elongation at Break | Longitudinal Tear Strength (N/m) | Transverse Tear Strength (N/m) |
|---|---|---|---|---|---|---|
| Embodiment 1 | 38.69 | 29.83 | 223.54% | 850.76% | 121 | 144 |
| Embodiment 2 | 34.57 | 26.55 | 243.48% | 908.96% | 133 | 160 |
| Embodiment 3 | 30.22 | 21.03 | 270.15% | 932.01% | 151 | 182 |
| Control Group 1 | 39.21 | 29.95 | 213.68% | 811.70% | 102 | 116 |
| Control Group 2 | 39.11 | 28.54 | 219.33% | 809.25% | 119 | 147 |

Based on the above test results, the highly transparency PBAT cling film produced by the solutions of the invention has better anti-fog, adhesion and shrinkage properties, and the oxygen transmission rate and moisture transmission rate have also been significantly improved; in terms of mechanical properties, the tensile strength decreases slightly, but the tear strength and elongation at break are both significantly improved.

In the invention, ACR is added into PBAT resin, which increases the ductility, shrinkage property and flatness of winding of PBAT cling films; glycerin can improve the extrusion stability, softness and adhesion properties of PBAT cling films; glycerin fatty acid ester can improve the anti-fog property of PBAT cling films; meanwhile, glycerin and glycerin fatty acid can play a synergistic role to further enhance the anti-fog property of PBAT cling films. The PBAT cling film prepared by the invention has superior physical property, high transparency, high adhesion property, high shrinkage property, smooth flatness of winding free of wrinkles and good air permeability.

The specific embodiments of the invention have been described in detail hereinabove, but they are only used as embodiments. Any equivalent modifications and substitutions to the invention made by those skilled in the art all fall within the protection scope of the invention. Therefore, equivalent transformations and modifications made without departing from the spirit and scope of the invention shall all fall within the protection scope of the invention.

The invention claimed is:

1. A preparation method of highly transparent self-adhesive PBAT cling film, comprising the following steps:
   S1, adding PBAT, ACR, glycerin, glycerin fatty acid ester to a mixer in proportion to mix, to obtain a uniformly mixed material;
   S2, extruding, stretching, cooling, and pelletizing the obtained uniformly mixed material in an extruder to obtain pellets for producing cling film;
   S3, adding the obtained pellets to the film blowing machine for extrusion, inflation, traction, cooling, and winding to obtain a highly transparent self-adhesive PBAT cling film;
   S4, rewinding the cling film obtained in S3 to prepare a small roll of highly transparent self-adhesive PBAT cling film;
   as the weight of the uniformly mixed material is 100%, the amount of each component in S1 by weight is: 88-94.5% of PBAT, 3-8% of ACR, 0.5-1% of glycerin, and 1-3% of glycerin fatty acid ester; the PBAT is a copolymer of butanediol adipate and butylene terephthalate, the ACR is a copolymer of acrylate, and the molecular weight of the ACR is 500-10000.

2. The preparation method of highly transparent self-adhesive PBAT cling film according to claim 1, wherein the extruder in S2 adopts a twin-screw extruder.

3. The preparation method of highly transparent self-adhesive PBAT cling film according to claim 2, wherein the length-diameter ratio of the screw in the twin-screw extruder is 52:1.

4. The preparation method of highly transparent self-adhesive PBAT cling film according to claim 1, wherein the barrel temperature of the twin-screw extruder in S2 is 140-155° C., and the die temperature thereof is 155-170° C.

5. The preparation method of highly transparent self-adhesive PBAT cling film according to claim 1, wherein the barrel temperature of the film blowing machine is 150-165° C., the die temperature thereof is 165-180° C., and the blowup ratio is 3.

6. The preparation method of highly transparent self-adhesive PBAT cling film according to claim 1, wherein the mixer is a high-speed mixer, and the rotational speed of the high-speed mixer is 200 r/min.

7. The preparation method of highly transparent self-adhesive PBAT cling film according to claim 1, wherein the rewinding step in S4 is performed on a cling film rewinding machine, and the speed of the cling film rewinding machine is 100-150 m/min.

\* \* \* \* \*